United States Patent [19]
Sprouse et al.

[11] Patent Number: 5,534,363
[45] Date of Patent: Jul. 9, 1996

[54] HOLLOW ARTERY ANODE WICK FOR PASSIVE VARIABLE PRESSURE REGENERATIVE FUEL CELLS

[75] Inventors: Kenneth M. Sprouse, Northridge, Calif.; James D. Navratil, Nederland, Colo.

[73] Assignee: Rockwell International Corporation, Seal Beach, Calif.

[21] Appl. No.: 215,547

[22] Filed: Mar. 22, 1994

[51] Int. Cl.[6] .................................................. H01M 8/04
[52] U.S. Cl. ............................................. 429/34; 431/325
[58] Field of Search ............................... 429/34; 431/325

[56] References Cited

U.S. PATENT DOCUMENTS

| | | | |
|---|---|---|---|
| 3,560,264 | 2/1971 | Biddick | 429/34 X |
| 4,467,019 | 8/1984 | Feigenbaum | 429/34 |
| 4,657,829 | 4/1987 | McElroy et al. | 429/19 |
| 5,064,732 | 11/1991 | Meyer | 429/13 |
| 5,124,200 | 6/1992 | Mallonee | 431/325 X |
| 5,306,577 | 4/1994 | Sprouse | 429/21 X |

*Primary Examiner*—Stephen Kalafut
*Attorney, Agent, or Firm*—George A. Montanye; Harry B. Field; Steven E. Kahm

[57] ABSTRACT

An anode wick for use with electrochemical fuel cells, in accordance with the invention, establishes a physical connection between a fuel cell's anode membrane surface and a liquid water reservoir. Wicking action substantially ensures the cell's anode surface is continually bathed in water. Two mechanical check valves are incorporated to effectively prevent mixing of gaseous hydrogen and oxygen gases in the event the fuel cell system's water tanks become over pressurized. This design can effectively eliminate the need for some of a conventional fuel cell system's pumps and/or compressors. Advantageously, the invention also reduces the overall weight and mechanical complexity of the fuel cell system, thereby improving system reliability.

13 Claims, 3 Drawing Sheets

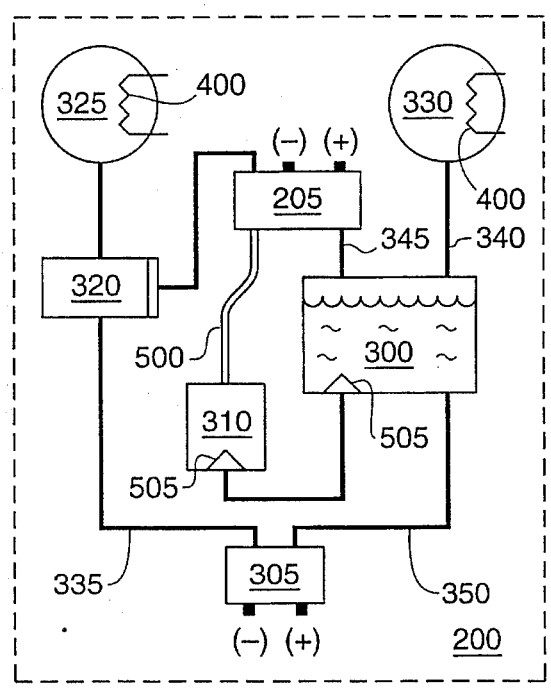
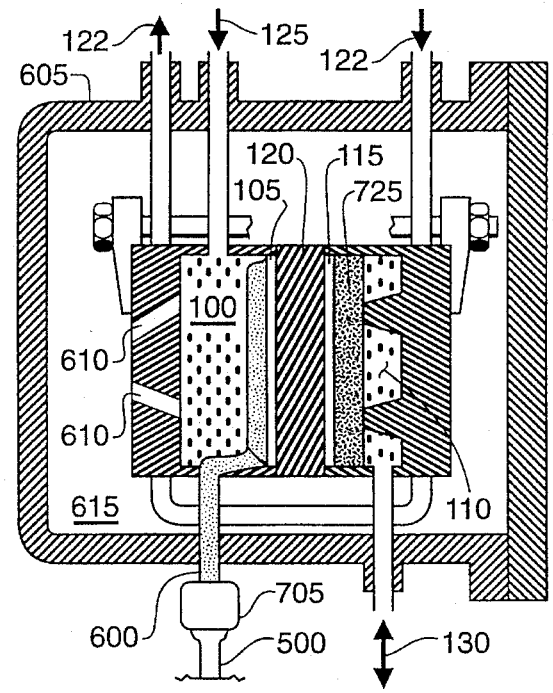
Fig.5
Fig.6
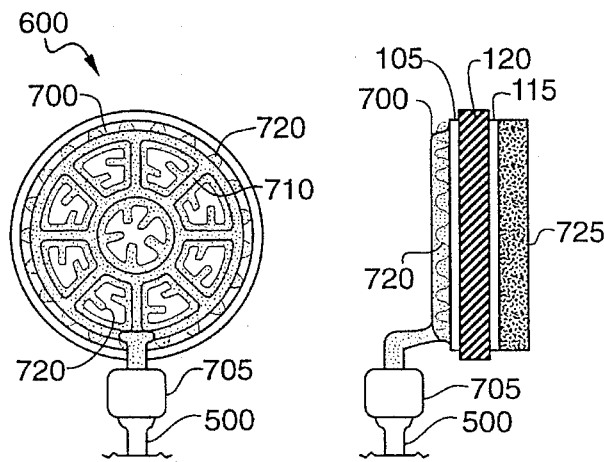
Fig.7a
Fig.7b
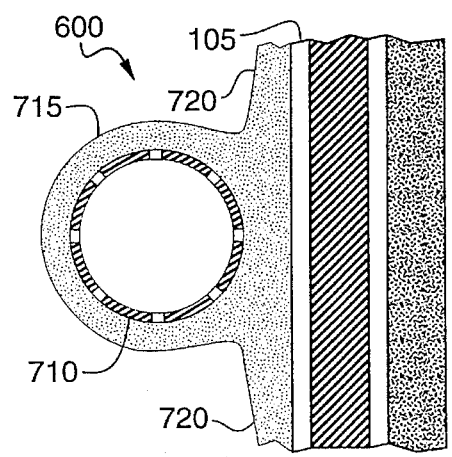
Fig.8

HOLLOW ARTERY ANODE WICK FOR PASSIVE VARIABLE PRESSURE REGENERATIVE FUEL CELLS

This application claims priority on allowed and commonly owned U.S. patent application Ser. No. 08/201,508, filed on 24 Feb. 1994, entitled "A Quasi-Passive Variable Pressure Regenerative Fuel Cell System."

BACKGROUND OF THE INVENTION

The invention relates, in general, to an apparatus for converting chemical energy into electrical energy through the process of electrolysis of water. Specifically, the invention describes an advantageous design modification for conventional fuel cells. During power drawing operations, a fuel cell generates energy by combining hydrogen and oxygen gas to form water. During charging operations, an electrolyzer is used to convert water back into its constituent parts; hydrogen and oxygen.

1.1 Configuration of a Typical Fuel Cell

A typical electricity-generating fuel cell is shown schematically in FIG. 1. Each cell is comprised of an anode chamber 100 having a porous anode 105 and a cathode chamber 110 having a hydrophobic porous cathode 115 separated by an electrolytic membrane 120, known as a proton exchange membrane (PEM). As is well-known to those of ordinary skill, this membrane may be an acid or a solid polymer such as Nafion (a trademarked product of E.I. DuPont de Nemours of Wilmington, Del., which is a polymer of polytetrafluoroethylene with fluorinated ether side chains terminated with sulfonic acid groups). The PEM material is designed to readily permit the transport of ions and solvent between the anode and cathode chambers, but to be relatively impermeable to gas.

During power generation at terminals 135, hydrogen 140 is typically applied to a fuel cell's anode 105 via an opening 125 and oxygen to the cell's cathode 115 via opening 130, with water forming in the cell's cathode chamber 110 from oxidation of the hydrogen. On the other hand, during charging operations, water is typically applied to the cell's anode 105, with oxygen being extracted from the cell's anode chamber 100 via an opening 125, and hydrogen being extracted from its cathode chamber 110 via an opening 130.

1.2 Basic Operational Components of a Fuel Cell System

Referring to FIG. 2, it is well-known to those of ordinary skill that fuel cell systems have long been used in specialized electrical power generation applications such as spacecraft. In such systems, a plurality of fuel cells (e.g., a fuel cell system) can behave as a monolithic battery. A battery 200 includes a fuel cell 205 and additional supporting equipment (not shown). The battery 200 delivers electrical power over a power line 210 to electrical loads such as lights 215, radios 220, and so forth.

As shown in FIG. 3, a basic passive, variable pressure, regenerative fuel cell system 200 from the prior art comprises a regenerative fuel cell component 205 which sits above a main water tank 300, an electrolyzer 305 which sits below the main water tank 300, a small secondary water tank 310, a water flow restriction orifice or fluid flow valve 315 communicating with the main water storage tank 300 and the secondary water storage tank 310, a liquid gas separator 320, a gaseous hydrogen storage tank 325, and a gaseous oxygen storage tank 330. Such fuel cell systems commonly use a multiplicity of fuel cells which are designed, for example, to deliver 30 kilowatt-hours of electrical energy at a nominal power level of 2.5 kilowatts at 120 volts. (For convenience, the expression "fuel cell" is used to represent an element comprised of one, or more, individual fuel cells unless otherwise noted.)

Typically, a hydrogen line 335 from the hydrogen supply tank 325 is connected to both the fuel cell 205 and electrolyzer 305. In this configuration, hydrogen is supplied to the anode side of the fuel cell 205 (during power generation operations) and is extracted from the cathode side of the electrolyzer 305 (during recharge operations). An oxygen line 340 is attached to the water tank 300 which, via line 345, directs oxygen to the fuel cell's 205 cathode.

The fuel cell, water tank, and electrolyzer are stacked vertically as shown so that liquid water produced at the fuel cell's cathode (where electrons are consumed) is concurrently drained directly into the main water tank 300 through line or conduit 345 via gravitational forces, while water stored in the main water tank can be, in turn, gravitationally fed to the anode side of the electrolyzer (where electrons are produced) through line or conduit 350.

During recharge operations, oxygen produced at the electrolyzer's 305 anode passes through line 350 and into water tank 300 where it bubbles up, through line 340, to the oxygen storage tank 330. Concurrently, hydrogen produced at the electrolyzer's cathode is returned to the hydrogen storage tank 325 through a liquid-gas separator 320.

Individual cells of both the fuel cell and electrolyzer are sometimes interconnected in a series arrangement, often called a "stack." The number of cells in this series is determined by the desired DC voltage. Under fully charged conditions (approximately 21 MPa or 3,000 psi) the open circuit DC voltage of each individual fuel cell is approximately 1.3 volts while under fully discharged conditions (approximately 0.7 MPa or 100 psia) the open circuit DC voltage of each cell is approximately 1.2 volts.

1.3 Problem of Fuel Cell PEM Membrane Drying

A major concern in a fuel cell system such as that shown in FIG. 3 is to prevent dryout, and the devolatilization and cracking of the fuel cell's 205 PEM anode surface that may result, during brief periods of water feed interruption to the anode chamber 100 which are made possible by the passive operating nature of this electrochemical device. Dryout can occur because aqueous protons migrating across the PEM 120 during normal fuel cell operation (from anode side to cathode side) carry liquid water molecules along with them which, if not replenished, will lower the water concentration on the PEM's anode surface. Dryout prevention is often accomplished by holding a reservoir of excess water in close contact with the fuel cell's PEM anode surface. Any PEM dryout at high cell pressures will quickly lead to electrolyte oxidation and subsequent fuel cell failure.

1.4 Some Prior Approaches to the PEM Dryout Problem

One prior approach to solving the problem of proton exchange membrane dry-out in regenerative fuel cells is proposed in U.S. Pat. No. 4,657,829 to McElroy et al. McElroy et al. propose a hydrogen/air fuel cell having a water electrolysis sub-system and gas storage system. The electrolysis subsystem comprises a plurality of bipolar cells. Water is introduced into the anode chambers of the electrolysis cells from liquid/vapor separators. Hydrogen and oxygen produced by the cells are fed to these liquid/vapor separators. Excess water from the anode chamber and water pumped via electroosmosis across the membrane with the hydrogen ions, is separated from the gases and introduced into respective pressurized storage vessels. Each storage vessel contains a float switch which actuates pumps and drain valves to feed water to the electrolyzer. As the oxygen and hydrogen in the pressure vessels are consumed, their pressure drops and a signal from a pressure transducer causes additional water to be electrolyzed to replenish depleted oxygen and hydrogen levels. The electrolyzer system associated with a fuel cell stack described above is potentially limited, however, by a multiplicity of possible switching and fluid flow control functions.

Another proposed solution is set out in U.S. Pat. No. 5,064,732, to Meyer. The Meyer '732 patent proposes disposing a porous element between two adjacent cells of a fuel cell stack, namely the cathode chamber of a first cell and the anode chamber of a second cell. A pressure differential is maintained across the porous element to cause water to pass through the porous element from the cathode chamber to the anode chamber. A potential detriment with the Meyer '732 patent is that the cathode chamber must always be held at a higher pressure than the anode chamber. This can prevent the operation of the electrolyzer during power generation operations.

The prior approaches discussed above share some common general problems. Most notably, a variety of additional equipment is needed to address the problem of PEM dryout. Additional pumps, valves, compressors, and so forth add to the cost of systems, increase their weight, and contribute to whatever unreliability problems may already exist. (It is a well-known fact of engineering that the greater the number of components involved in a system, in general the shorter the mean time to failure of the system.)

FIG. 4 shows another prior art approach that makes use of pressure differentials between the hydrogen storage tank 325 and the oxygen storage tank 330. During fuel cell operation, the temperatures in the tanks are controlled via temperature control elements 400 so that the hydrogen storage tank is at a lower pressure than the oxygen storage tank so that water will flow from the water tank into the anode side of the fuel cell. During electrolyzer operation on the other hand, the pressures in the tanks are reversed by the temperature control elements 400 so that water, produced at the cathode side of the electrolyzer, is allowed to flow back into the water tank, facilitated by having the hydrogen storage tank 325 pressure higher than the oxygen storage tank 330 pressure. As with the other prior approach techniques discussed, this solution requires extra equipment to implement and, therefore, suffers from the same cost and reliability drawbacks as the previously cited prior art designs.

SUMMARY OF THE INVENTION

Conventional passive, variable pressure, regenerative fuel cell systems utilize mechanical valves, pressure regulators, feed pumps, and recirculation pumps. Many systems also include active heating and cooling control loops in both the gaseous hydrogen and oxygen storage tanks to feed water to the anode side of the fuel cell during electrical power production (to prevent fuel cell anode drying), and for draining water from the cathode side of the electrolyzer during electrical recharging operations.

A fuel cell design in accordance with the invention, uses an anode wick to substantially reduce the probability of drying a fuel cell's anode membrane surface. An anode wick, in accordance with the invention, establishes a physical connection between a fuel cell's anode membrane surface and a liquid water reservoir. Wicking action substantially ensures the cell's anode surface is continually bathed in water. Two mechanical check valves are incorporated to effectively prevent mixing of gaseous hydrogen and oxygen gases in the event the fuel cell system's water tanks become over pressurized. This design can effectively eliminate the need for some of a conventional fuel cell system's pumps and/or compressors. Advantageously, the invention also reduces the overall weight and mechanical complexity of the fuel cell system, thereby improving system reliability.

BRIEF DESCRIPTION OF THE DRAWINGS

FIG. 5 is a block diagram representation of an ultra-passive, variable pressure, regenerative fuel cell system.

FIG. 6 is a mechanical schematic of a pressurized fuel cell utilizing the invention's wicked anode structure.

FIGS. 7a, 7b 8, and 9 are mechanical schematic representations of one embodiment of the invention's hollow anode wick structure.

DETAILED DESCRIPTION OF SPECIFIC EMBODIMENTS

Figure 1:
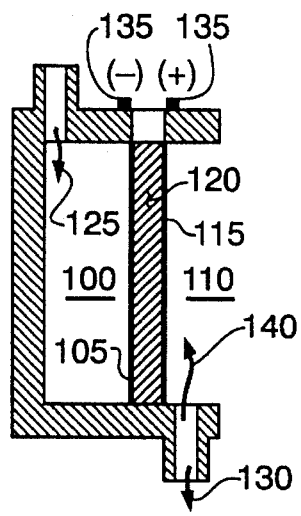
FIG. 1 is a block diagram representation of a conventional gaseous hydrogen, gaseous oxygen fuel cell.
Figure 2:
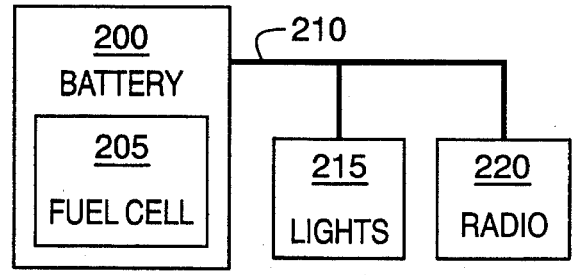
FIG. 2 is a block diagram representation of a battery powered electrical system employing a fuel cell system.
Figure 3:
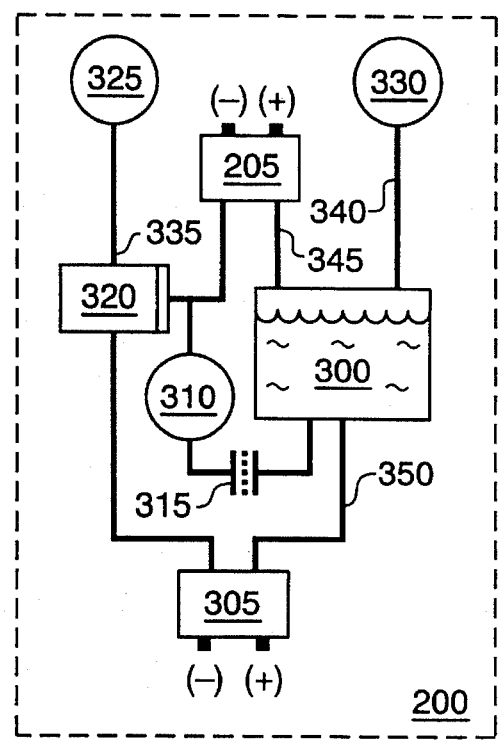
FIGS. 3 and 4 are block diagram representations of a fuel cell system.
Figure 4:
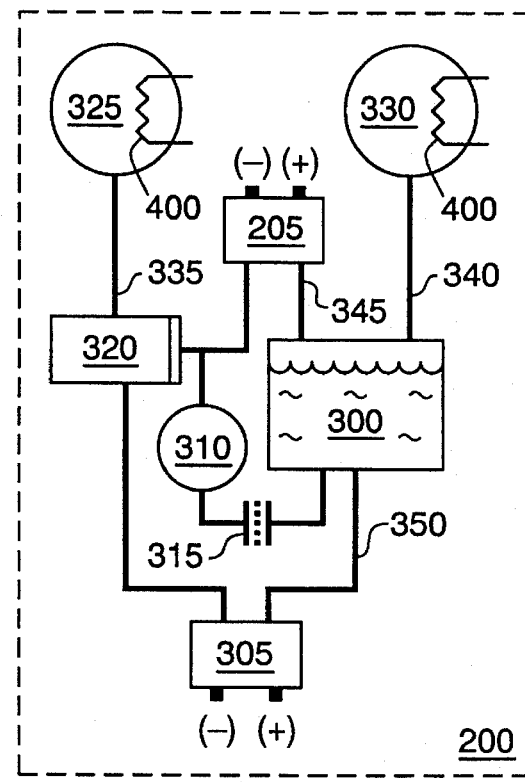

One illustrative embodiment of a fuel cell system which incorporates the invention's novel anode wick design is shown if FIG. 5. For convenience, we denote such a system as an ultra-passive, variable pressure, regenerative fuel cell system, hereafter referred to as a UPVPR fuel cell system.

While only one fuel cell is shown, it is to be understood that the fuel cell system of the present invention contemplates the use of a multiplicity of fuel cells. Similarly, the electrolyzer 305 may be comprised of a multiplicity of cells.

A hydrogen line 335 from the hydrogen gas supply tank 325 is connected to both the fuel cell 205 and electrolyzer 305. In this configuration, hydrogen is supplied to the anode side of the fuel cell and is extracted from the cathode side of the electrolyzer. An oxygen line 340 is attached directly from the internal oxygen storage tank 330 to the main water tank 300. From the main water tank, oxygen is transferred to the cathode side of the fuel cell through line or conduit 345.

As shown in FIG. 5, the fuel cell 205, main water tank 300, and electrolyzer 305 are stacked vertically so that the liquid water produced at the fuel cell's cathode is concurrently directly drained into the water tank through line 345 via gravity. Water stored in the main water tank can also be fed, under gravity, to the anode side of the electrolyzer. During operation of the electrolyzer, oxygen produced at the electrolyzer's anode (not shown) passes through line 350 into the main water tank and, from there, back to the internal oxygen storage tank 330 via line 340.

An anode water feed line 500, exiting the top the secondary water tank 310, is connected directly to the bottom of the fuel cell 205. Furthermore, the anode water feed line 500 is completely wicked—from the top of the secondary water tank to the bottom of the fuel cell—where it (the wick) makes direct contact with the fuel cell's anode surface.

Some possible embodiments of an UPVPR system's fuel cell wick design are discussed below with reference to FIGS. 7–13.

Ball and cage check valves 505 in the main and secondary water storage tanks are incorporated to prevent the possible mixing of hydrogen and oxygen gases in the event either the water tank is emptied of water due to inadvertent over pressurization of either the hydrogen gas or oxygen gas storage tanks.

4.1 Hollow Artery Anode Wick Designs

Inclusion of an anode wick in the design of a fuel cell system advantageously reduces: (a) the likelihood of the PEM's anode surface from drying, a well-known problem in conventionally designed fuel cell systems, and (b) the number of elements such as pumps, compressors, and valves needed to implement the system. This latter feature also makes the UPVPR fuel cell system lighter and more (mechanically) reliable. (The reduction in required equipment such as pumps and compressors motivates the use of the "ultra" modifier in the name ultra-passive, variable pressure, regenerative fuel cell system.)

FIG. 6 shows a schematic of one specific embodiment of a fuel cell, utilizing a wicked design, that addresses the problem of proton exchange membrane (PEM) drying. A basic difference between the prior art fuel cell of FIG. 1 and the design shown in FIG. 6 is the inclusion in the latter of an anode wick 600 in contact with the fuel cell's anode surface 105, running down through the bottom of the fuel cell's anode chamber 100 and attaching to the anode water feed line 500 of FIG. 5.

Because the UPVPR fuel cell is a high pressure device (operating between, roughly, 21 MPa or 3000 psi and 0.7 MPa or 100 psi), the fuel cell assembly is located inside a pressure vessel assembly 605 designed to also contain hydrogen gas. Hydrogen gas within the anode chamber 100 is in direct communication with the anode electrode 105 via vent passages 610. This prevents the PEM 120 from rupturing due to pressure imbalances within the fuel cell assembly—i.e., between anode/cathode chambers (100 and 110) and outer cavity 615.

4.1(a) Wagon-Wheel Wick Design

Incorporating hollow arteries into the design of an anode wick helps to significantly reduce the amount of wick material (both mass and volume) required for pumping water from a water reservoir (e.g., tank 310 of FIG. 5) and distributing it over the face of the fuel cell's anode surface. By reducing the wick's size, more of the anode's surface can be exposed to hydrogen gas, allowing the relatively high fuel cell current densities required for successful variable pressure passive regenerative fuel cell operation.

Details of one embodiment of a hollow artery anode wick 600 are shown in FIGS. 7a 7b and 8. This wick comprises a water feed pipe 500 which transports water from a reservoir (e.g., the secondary water tank 310) to the base of a "wagon-wheel" wick frame 700. The attachment of the water feed pipe 500 to the wick frame 700 occurs at a wick/pipe coupling 705. The feed pipe 500 is hollow, non-porous, eclectically non-conducting, and ionically non-conducting.

The wagon-wheel wick frame 700 (which may or may not be in the form of a wagon-wheel depending upon electrode geometry) is made from hollow tubing 710 having porous walls. This porous tubing may be metal or plastic, and is sized to move relatively large quantities of liquid water at a low pressure drop while giving structural support for a porous fabric/foam cover 715. The wagon-wheel frame serves as the hollow arterial structure of the wick assembly.

Completely covering the wagon-wheel's porous tubing 710 is a porous fabric/foam cover 715 made of, e.g., open-pore polyurethane. More generally this cover should be made of a material capable of bonding (or sticking) to the porous tube 710 wall while having small characteristic pore dimensions and contact wetting angles capable of keeping the porous wagon-wheel tubing well primed with liquid water. This cover should also be capable of bonding to the surface of the fuel cell assembly's anode sheet. Other likely candidates for the porous fabric/foam cover include various plastic materials such as the polyurethanes and polytetrafluoroethylenes (PTFEs) that have been previously doped with, e.g., solid wetting agents such as cellulose, asbestos, metal particles, metal oxide particles and/or silicon oxide particles.

Emanating from the surface of the tube's porous fabric/foam cover 715 are numerous tiny porous fabric/foam fingers 720. In one embodiment, the fingers 720 may be of the same material as the cover 715.

The actual fabric/foam material selected for use as the wick's cover and fingers can be greatly determined by the fuel cell's anode 105 material of construction. Traditionally, the anode layer has been made from porous PTFE plastic sheets containing various amounts of immobilized platinum black catalyst particles. However, more recent designs appear to be replacing the traditional PTFE electrode with a platinum doped thin-film Nafion sheet for improved performance and lower platinum loadings. It appears likely that every manufacturer's electrode will have different wetting characteristics in terms of pore size and wetting contact angle (i.e., the degree of hydrophelia). As such, the material in the anode's porous fabric/foam cover 715 and fingers 720 can be tailored to match the polymeric composite used by any given fuel cell manufacturer on the anode. This matching can be accomplished by artificially changing (via chemical composition and curing techniques) the wick's cover/finger contact angle and pore size.

It needs to be appreciated that the anode 105, cathode 115, PEM 120, and wet-proofed carbon paper 725 is an integral structure—developed over the past 30 years by a number of different commercial entities spending significant sums of money. As such, fuel cell developers and manufacturers may hold as trade secret the exact physical and chemical characteristics of their cell's electrodes. Selecting the proper anode wick materials for a given manufacturer's fuel cell can, therefore, require subsequent dismantling and analysis.

In addition to anode wetting concerns, the wick's 600 materials of construction must also be compatible with high pressure gaseous hydrogen. Hydrogenation to methane gas is a possible design concern. Polytetrafluoroethylenes are known to be a relatively stable material in high pressure/low temperature hydrogen atmospheres. For wick stability however, binder additives (i.e., cellulose, etc.) used during wick manufacture should also be stable in high pressure gaseous hydrogen environments.

Figure 9:
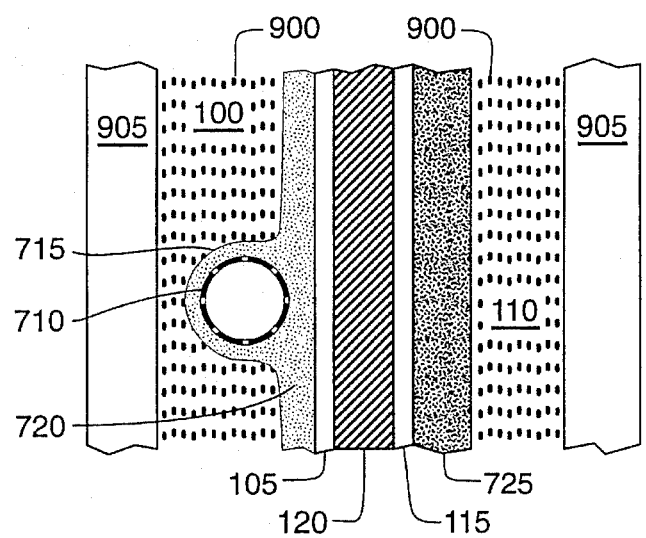

FIG. 9 shows an illustrative cross sectional view of a fuel cell utilizing a wagon-wheel wick design. The wick's hollow tubing 710 and fingers 720 are shown inside the anode's 105 hydrogen gas chamber 100. This cavity contains a large mesh metal wire screen current collector 900 held by compression between the anode side of the PEM 120 and the (liquid cooled) metal $H_2/O_2$ separator plate 905. The current collector 900 moves electrons produced at the anode 105, through the anode chamber 100 and onto the $H_2/O_2$ separator plate 905. The screen 900 is allowed to simply lay up against the wick's 600 porous filler/foam cover 715 and fingers 720. The porosity of the current collector 900 should be large enough to prevent water in the wick 600 from entering and saturating the current collector's pore structure. The cathode aspect of the fuel cell is unaltered from conventional designs.

Alternate embodiments of the wagon-wheel wick design include hollow artery wick structures made directly from tapered and hair size tubing. Commercially available mini-tubing can be tygon, silicone, polyethylene, polyurethane, teflon and the like which has been treated (i.e., doped) if necessary to become hydrophilic. Such tubing can be molded, heat shrunk, sintered, stretched and tapered with heat treatment to form various configurations.

Figure 10:
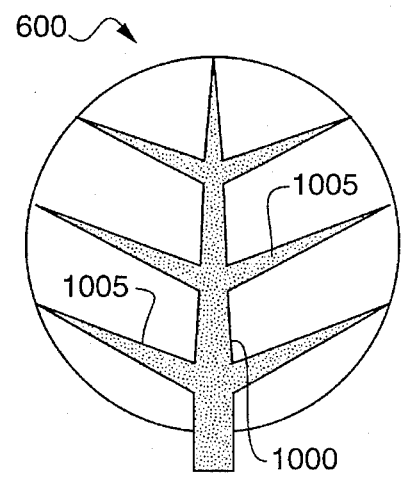
FIG. 10 is a block diagram representation of another embodiment of the inventions hollow anode wick structure.
Figure 11:
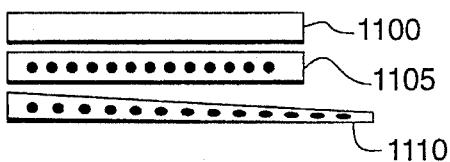
FIGS. 11 and 12 are representations of hollow tubing that can be used to manufacture the invention's hollow artery anode wicks.
Figure 12:

A first alternate embodiment is shown in FIG. 10 where hair sized tapered tubing has been formed into the shape of a tree trunk with branches. The trunk 1000 and branch 1005 structures can be constructed from hollow tubing 1100 which has been first perforated 1105 with small holes (using heated needles, drills, or similar tools) and subsequently tapered, see FIG. 11. These perforated and tapered 1110 tubing segments can be connected and sintered together (as shown in FIG. 12) for delivering anode make-up water across the face of the electrode. Small holes serve both as tubing connectors and watering ports. Such mini-tubing may or may not require porous fabric/foam covers depending upon the wetting characteristics of the fuel cell's anode material and the water make-up flow requirements. The tubing's small perforated holes may be capable of producing the required pumping head all on their own.

4.1 (b) Woven-Cloth Wick Design

An alternative anode wick design replaces the porous fabric/foam fingers of the wagon-wheel wick with the hydrophobic/phelic (HPP) knit cloth shown in FIG. 13. As seen in FIG. 13 the HPP knit cloth 1300 is knitted from two different types of thread: hydrophobic (i.e., water repellent) and hydrophilic (i.e., water absorbing). Both threads are treated so that they are conductive to free electrons. Hydrophobic threads can be made from PTFE fibers currently used in making water repellent fabrics for outdoor/mountaineering type clothing. Hydrophilic threads can be made from fibers of sulfonated PTFE, the basic material used in making a fuel cell's proton exchange membrane. Conventional cotton cloth type threads containing cellulose may be substituted for the sulfonated PTFE hydrophelic fibers. Threads made from "rice hull" fibers may also be used because they are very hydrophilic and contain natural electron conducting graphite.

As shown in FIG. 13, the HPP knit cloth 1300 contains repetitive square hydrophobic regions 1305. These regions substantially effectively exclude all liquid water and allow for the passage of hydrogen gas to the anode 105. Surrounding each hydrophobic region are zones of hydrophilic stripes 1310. These stripes substantially effectively exclude hydrogen gas and allow for liquid water to be effectively transported (via wicking action) from the porous fabric/foam hollow artery 710 to all regions of the fuel cell's anode surface 105 for dryout prevention.

The sizes of the HPP knit cloth's square and striped regions, together with the spacing distance between hollow arteries 710 laying across the HPP cloth's surface, are established by that geometry which maximizes overall fuel cell performance. This optimization is amenable to mathematical analysis.

Figure 13A:
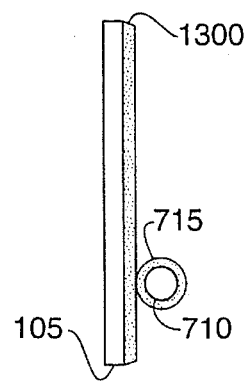
FIG. 13a 13b represents an alternative means of manufacturing a hollow artery anode wick backing material in accordance with the invention.
Figure 13B:
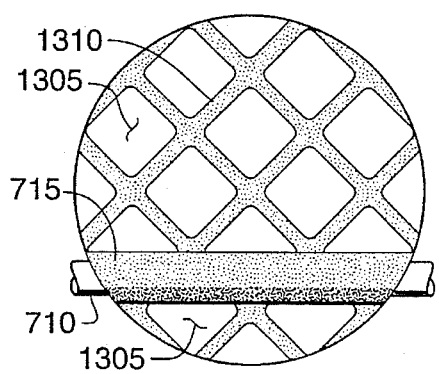

It is also possible to create a porous felt fabric having the same pattern as shown in FIG. 13a and 13b by using many short or chopped sections of these threads' fibers. Whether a knitted cloth is to be preferred over a felt fabric will depend on the comparative costs and manufacturing constraints.

4.2 Advantages of Invention

Advantages of the fuel cell system shown in FIG. 5 which incorporates an anode wick design in accordance with the invention include the following.

1. The described hollow artery anode wick designs reduce the possibility of fuel cell anode damage due to water flow interruptions while simultaneously reducing the weight and mechanical complexity (thereby increasing the system's reliability) of the fuel cell system.

2. Because the invention can reduce the number of pumps and/or compressors, the resulting system can be considerably lighter than conventional fuel cell systems or an equivalently powerful lead-acid battery. Thus, a system incorporating the invention is an ideal candidate for applications requiring low weight (e.g., motor vehicles).

In the interest of clarity, not all features of an actual implementation were described in this specification. It will of course be appreciated that in the development of any such actual implementation (as in any hardware design project), numerous implementation-specific decisions must be made to achieve the designers' specific goals and subgoals, such as compliance with system- and business-related constraints, which will vary from one implementation to another. Moreover, such an effort might be complex and time-consuming, but would nevertheless be a routine undertaking of design engineering for those of ordinary skill having the benefit of this disclosure.

It will be appreciated by those of ordinary skill having the benefit of this disclosure that numerous variations from the foregoing illustration will be possible without departing from the inventive concept described herein. Accordingly, it is the claims set forth below, and not merely the illustrative examples described herein that are intended to define the exclusive rights claimed in this design.

What is claimed is:

1. A fuel cell anode wick comprising:
   (a) a network of perforated arterial tubing that is:
       (1) formed in (A) a spoke-and-wheel configuration or (B) a trunk-and-branch configuration, and
       (2) wrapped in a hydrophilic porous covering;
   (b) a knitted or a felted fabric that includes:
       (1) a plurality of regions of hydrophobic fibers comprising polytetrafluroethylene, at least some of said regions being rectangular, and
       (2) a plurality of hydrophilic fibers communicating with said hydrophilic porous covering that transverse said fabric and that defines said plurality of regions of hydrophobic fibers, at least some of said hydrophilic fibers comprising (A) proton exchange membrane fibers or (B) rice hulls.

2. A fuel cell anode wick comprising a network of perforated arterial tubing wrapped in a hydrophilic porous covering.

3. The fuel cell anode wick of claim 2, further comprising a fabric that includes a plurality of hydrophilic fibers and a plurality of hydrophilic fibers, said plurality of hydrophilic fibers in said fabric communicating with said hydrophilic porous covering.

4. The fuel cell anode wick of claim 2, wherein said network of perforated arterial tubing is formed in (a) a spoke-and-wheel configuration, or (b) in a trunk-and-branch configuration.

5. The fuel cell anode wick of claim 2, wherein said hydrophilic porous covering comprises open-pore polyurethane.

6. The fuel anode wick of claim 3, wherein said fabric comprise (a) a network of criss-crossing hydrophilic stripes comprising hydrophilic fibers and (b) a plurality of regions of hydrophobic fibers that lie between and are mutually by said criss-crossing hydrophilic stripes.

7. The fuel cell anode wick of claim 3, wherein said plurality of hydrophilic fibers are hollow.

8. The fuel cell anode wick of claim 3, wherein said plurality of hydrophilic fibers comprises a fabric that includes a plurality of hydrophobic regions mutually isolated by a plurality of hydrophilic regions traversing said fabric.

9. The fuel cell anode wick of claim 6, wherein at least some of said regions of hydrophilic fibers are rectangular.

10. The fuel cell anode wick of claim 8, wherein at least some of said plurality of hydrophobic regions are rectangular.

11. The fuel cell anode wick of claim 8, wherein said fabric is (a) knitted or (b) felted.

12. The fuel cell anode wick of claim 8, wherein said plurality of hydrophobic regions comprises polytetrafluoroethylene fibers.

13. The fuel cell anode wick of claim 8, wherein said plurality of hydrophilic fibers comprises (a) proton exchange membrane fibers or (b) rice hulls.

\* \* \* \* \*